United States Patent
Simpson et al.

(10) Patent No.: US 8,603,629 B2
(45) Date of Patent: Dec. 10, 2013

(54) FLASHING AND WATERPROOFING MEMBRANE

(75) Inventors: Robert S. Simpson, Coshocton, OH (US); Michael L. Wright, Warsaw, OH (US); Whitney J. Croft, Fresno, OH (US)

(73) Assignee: MFM Building Products Corporation, Coshocton, OH (US)

( * ) Notice: Subject to any disclaimer, the term of this patent is extended or adjusted under 35 U.S.C. 154(b) by 0 days.

(21) Appl. No.: 12/581,222

(22) Filed: Oct. 19, 2009

(65) Prior Publication Data

US 2011/0091675 A1    Apr. 21, 2011

(51) Int. Cl.
B32B 33/00 (2006.01)
B32B 37/02 (2006.01)
B32B 37/14 (2006.01)
B32B 3/10 (2006.01)

(52) U.S. Cl.
USPC .......... 428/343; 428/40.3; 428/137; 428/332; 428/334; 156/280

(58) Field of Classification Search
None
See application file for complete search history.

(56) References Cited

U.S. PATENT DOCUMENTS

| | | | |
|---|---|---|---|
| 4,322,928 A * | 4/1982 | Freiborg | 52/521 |
| 4,503,106 A * | 3/1985 | Cogliano | 428/40.3 |
| 4,636,414 A * | 1/1987 | Tajima et al. | 428/40.3 |
| 4,936,938 A | 6/1990 | Simpson et al. | |
| 5,096,759 A | 3/1992 | Simpson et al. | |
| 5,142,837 A | 9/1992 | Simpson et al. | |
| 6,103,356 A | 8/2000 | Messenger | |
| 6,479,119 B1 | 11/2002 | Simpson | |
| 6,627,017 B2 | 9/2003 | Simpson | |
| 7,201,820 B2 * | 4/2007 | Wiercinski | 156/247 |
| 2003/0003290 A1 * | 1/2003 | Hisano et al. | 428/308.4 |
| 2003/0039789 A1 * | 2/2003 | Simpson | 428/40.1 |
| 2006/0059825 A1 * | 3/2006 | Wiercinski et al. | 52/506.01 |

* cited by examiner

Primary Examiner — Callie Shosho
Assistant Examiner — Cheng Huang
(74) Attorney, Agent, or Firm — Jason H. Foster; Kremblas & Foster

(57) ABSTRACT

A laminate tape that has a bottom layer of aggressive adhesive formulated to have sufficient adhesion to construction materials to as low as 20 degrees F. The adhesive is applied in a layer of about 2 to 5 mils. A second layer that is about 10 to 60 mils thick is made of rubberized asphalt, which provides self-sealing capabilities. In one embodiment, the first layer has strips of adhesive and sections of rubberized asphalt. The third layer is a film, which can be a thin, contiguous polymer, fabric or particulate. The laminate can be used where a strong adhesive is needed that will adhere to construction materials at or near 20 degrees Fahrenheit, while still retaining self-sealing characteristics.

9 Claims, 3 Drawing Sheets

FLASHING AND WATERPROOFING MEMBRANE

(e) BACKGROUND OF THE INVENTION

1. Field of the Invention

This invention relates generally to a self-adhesive laminate and a method for using the laminate to seal around windows, doors, roofing, roof flashing and in other construction environments, and a method of constructing the laminate.

2. Description of the Related Art

In building construction generally, there are many areas of the building in which two materials do not seal perfectly. Even if materials seal well when installed, it is known that buildings settle and, with extremes in temperatures and humidity, buildings expand and contract. When these occur, two contacting materials will separate. Separation in materials that are designed to keep out air, moisture and pests can lead to inefficiency, damage and infestation.

In particular, prefabricated windows are supplied with a metal or polymer flange along their perimeter. This flange is typically nailed or screwed to the building sheathing, such as oriented strand board (OSB), during installation of the window in a rough opening formed in the wall for the window. The finish siding is applied over the sheathing and the flange, and commonly abuts a protruding portion of the window.

The flange is not typically sealed against the sheathing in a water-tight manner, and therefore wind-driven rain can leak around the flange. Leaks can be prevented if a tape is applied to seal the joint between the flange and sheathing before the finish siding is applied. Such tapes attach to at least part of the width of the flange, bridging over any gap between the flange and sheathing, and attaching to the sheathing. The laminate's adhesive forms a seal along the entire outer perimeter of the flange and along the sheathing directly adjacent the flange, thereby providing the water-tight seal needed to prevent inefficiency, damage and pest infestation.

Various types of adhesive tapes or laminates have been used to seal these flanges, and these laminates generally include a polyethylene or polyester film adhered to a bitumen layer, which is commonly rubberized asphalt. Such tapes and related materials are described in U.S. Pat. No. 4,936,938 to Simpson et al.; U.S. Pat. No. 5,096,759 to Simpson et al.; U.S. Pat. No. 5,142,837 to Simpson et al.; U.S. Pat. No. 6,103,356 to Messenger; U.S. Pat. No. 6,627,017 to Simpson; and U.S. Pat. No. 6,479,119 to Simpson. The foregoing patents are incorporated herein by reference.

Although the laminates discussed in the foregoing patents are advantageous over previous technology, they have some disadvantages under extreme conditions. For example, the bitumen layer that is self-sealing around fasteners that penetrate the laminate also has acceptable adhesive properties at temperatures greater than 60 degrees Fahrenheit. Thus, such bitumen layers provide the adhesion to window flanges and sheathing under optimal conditions. However, construction work often must be performed when temperatures fall to as low as 20 degrees Fahrenheit. Conventional laminates may not adhere acceptably in such circumstances, especially when the surfaces to which laminates must adhere have non-ideal textures to which adhesives do not readily adhere even under ideal temperature conditions. Because OSB is made with a waxy coating that provides release from forming molds, it is often difficult to adhere to OSB, even in warm weather.

Two types of adhesives are typically used on flashings for windows and doors: rubber modified asphalt and butyl rubber. A disadvantage of rubberized asphalts is that they have a relatively high temperature (such as 50 degrees F.) below which they lose sufficient adhesion. Butyl rubber adhesives retain their adhesive characteristics at lower temperatures, but are relatively expensive compared to asphalt based adhesives. Typically butyl rubber layers are not thick enough to provide nail-sealing capabilities without being prohibitively expensive.

The present invention solves these and other problems present in the prior art by providing a number of features. These features result in the present invention being a significant improvement over the prior art.

(f) BRIEF SUMMARY OF THE INVENTION

The invention is a hybrid laminate that combines the advantageous features of adhesives with an asphalt-based membrane and a film. The laminate has a bottom layer of preferably hot melt adhesive formulated to have sufficient adhesion to construction materials such as wood, metal, vinyl and wood composites such as OSB, down to a lower temperature, such as 20 degrees F. The adhesive can be relatively expensive, but because it is applied in a thin layer (2 to 5 mils ($1/1000^{th}$ inches) preferred) the cost is not prohibitive. A second layer that is relatively thicker (e.g., 10 to 60 or 20 to 60 mils) than the bottom layer is made of rubberized asphalt. The rubberized asphalt provides self-sealing capabilities and additional durability. The third layer is a top surface of film, which can be a thin, contiguous polymer, fabric or particulate.

The adhesive can be made of many acceptable materials, but is preferably selected from thermoplastic elastomers, such as SBS (styrene-butadiene-styrene), SIS (styrene-isoprene-styrene), acrylic, EVA (ethylene vinyl acetate) and SEBS (styrene-ethylene/butylene-styrene). The product can be used in many outdoor applications, including but not limited to door and window flashing joints, roofing applications, and others.

Pressure sensitive adhesives (PSA) and contact adhesives have specific application in the invention, because they adhere to most surfaces with very slight pressure, because they are often based on non-crosslinked rubber adhesives, acrylics or polyurethanes and form viscoelastic bonds that are aggressively and permanently tacky. Furthermore, because such adhesives adhere without the need of excessive pressure and require no activation by water, solvent or heat, they are well suited to the construction environment. Pressure sensitive adhesives and contact adhesives are available in a wide variety of chemical compositions or systems. Some of the most common types of systems include acrylic and methacrylate adhesives, rubber-based pressure sensitive adhesives, styrene copolymers (SIS/SBS), and silicones. Acrylic adhesives are known for excellent environmental resistance and fast setting time. Acrylic pressure sensitive adhesives often use an acrylate system. Ethylene ethyl acrylate (EEA) or ethylene methyl acrylate (EMA) copolymers are used to form hot melt PSA adhesives. Styrene-isoprene-styrene (SIS) and styrene-butadiene-styrene (SBS) copolymers are commonly applied in pressure sensitive adhesive applications. Silicone is produced through the hydrolysis and polymerization of silanes and siloxanes.

The laminate of the invention can be used in various circumstances in which a strong adhesive is needed that will adhere to construction materials at or near 20 degrees Fahrenheit, while still retaining self-sealing characteristics. This combination provides an excellent and reasonably priced product.

(g) BRIEF DESCRIPTION OF THE SEVERAL VIEWS OF THE DRAWINGS

Figure 1:
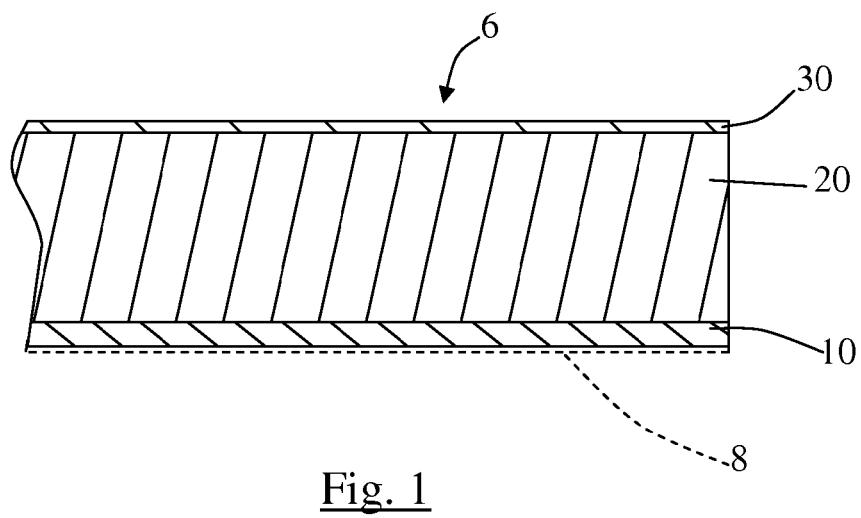
FIG. 1 is a side view in section illustrating a preferred embodiment of the present invention with the thicknesses of the layers exaggerated to show relative thicknesses and variations in characteristics across the laminate.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

(h) DETAILED DESCRIPTION OF THE INVENTION

The preferred laminate tape 6 is shown in FIG. 1 having a first layer 10, a second layer 20 and a third layer 30. The layers 10, 20 and 30 are attached together in a manner that renders each layer substantially non-removable from the other layers. This is preferably due to the tacky nature of the first and second layers, but can be due to special adhesives interposed between the layers.

In the preferred embodiment of the invention, the first layer 10 is a thin adhesive layer that is preferably formed in a hot-melt process by applying a liquefied material to a release liner 8 (illustrated in phantom) as described below. The release liner 8 is a conventional paper or polymer film that is coated on at least one major surface with a release agent that provides a weak bond between the liner and a sticky material, such as adhesive or mastic, but ready separation of the liner from the sticky material. The second layer 20 is preferably a thicker rubberized asphalt material that is preferably applied to the first layer 10 by a conventional process (for applying rubberized asphalt to a release liner or other substrate) described in at least one of the patents incorporated herein by reference. The third layer 30 is preferably a film, such as a metalized polyester film. Alternatively, the third layer 30 is a layer of aluminum foil laminated to cross-laminated polyethylene. The third layer 30 desirably provides advantageous features, such as reflectivity and/or ultraviolet (UV) light protection of the first and second layers, or reducing the tape's propensity to tear. The laminated tape 6 is durable, self-sealing and useful at extreme temperature conditions as described in more detail herein.

The second layer 20 is relatively thick, on the order of 10 to 60 mils, and is preferably rubberized asphalt. The second layer 20 is self-sealing, which means it tends to prevent the formation of openings from one side of the layer to the other through which water and/or air can pass if the layer 20 is pierced by a nail, screw or other fastener. This self-sealing property is an advantageous characteristic of the rubberized asphalt material, which permits a nail to penetrate all layers of the tape 6 without creating an opening that defeats the purpose of the tape 6. Self-sealing is due to the second layer 20 having elastomeric and/or fluent properties. These properties are sufficient to cause the material, after it has been penetrated and thereby deformed, by a fastener that displaces some of the material, to return to the configuration prior to insertion of the fastener, other than the presence of the fastener displacing some of the material. By the material "bouncing back" from the force of fastener insertion, it limits the size of the penetration aperture to that space which the fastener displaces or occupies.

The composition of the second layer 20 can be the same as the composition of conventional laminated membranes containing rubberized asphalts that are manufactured and sold by, for example, MFM Building Products Corporation of Coshocton, Ohio. In these products, the rubberized asphalt serves as the adhesive. One example of a material that is useful for the second layer 20 is found in the product sold by MFM Building Products Corporation under the trademark WINDOW WRAP. Of course, the composition can be modified, such as to reduce the additives due to the lower tackiness requirements of the second layer 20 due to the presence of the extremely tacky first layer 10.

The first layer 10 has adhesive characteristics that are superior to the rubberized asphalt, especially when the temperature of the environment is less than 50 degrees F. This adhesive is preferably attached very durably to the second layer 20, such as by a hot melt applicator. The first layer 10 is preferably formed in a layer of about 1 to about 10 mils thick. More preferably, the range of thickness is between about 2 mils and about 5 mils. Most preferably, the range of thickness is about 2 mils to about 3 mils. The first layer's thickness can vary across the layer by as much as 50%, and therefore the thicknesses listed herein are not an indicator of the exact thickness at every point on the tape 6.

The first layer 10 is an adhesive preferably made with SBS or SIS block copolymers, any other adhesive discussed herein or equivalents. Some are made with acrylic and EVA polymers, but this is not a requirement. There is a wide choice of adhesives discussed herein, and others known to persons of ordinary skill, that can be used with the preferred hot-melt application equipment. It is also known that some suitable adhesives need not be applied in a hot-melt process, but can be applied otherwise. In general, the desired adhesives tend to be more expensive than rubberized asphalt, but far more tacky at lower and higher temperatures than rubberized asphalt. Such adhesives do not have the self-sealing characteristics of rubberized asphalt unless they are used in a much thicker layer. However, an adhesive layer of sufficient thickness to self-seal would be prohibitively expensive.

Several samples constructed according to the present invention were tested in order to determine their strength in adhering to OSB at various temperatures. The samples were tested in a conventional 180 degree peel test (similar to ISO 8510-2:2006). In such a test, the rigid (OSB) material is gripped and the flexible, adhesive material (product made according to the invention) is adhered thereto. A force is applied to the adhesive material in a direction that tends to peel the adhesive material from the rigid material. The force required to peel the adhesive material away is then recorded per unit area of attachment between the two surfaces. The inventor(s) have determined that the first layer 10 must be made of a material that has a reliable peel test force of at least about 1.5 pounds per inch of material width for each use on OSB for all useful temperatures, and particularly as low as about 20 degrees F.

The following table lists the average force per unit width obtained after four tests for each material at temperatures listed for (1) a prior art material (Applicant's material sold under the trademark WINDOW WRAP) and (2) a material made according to the invention. In the tests, the samples and OSB plates were conditioned for at least one hour at the specified temperature to ensure that all components were at that temperature. The OSB was exterior grade one-half inch thick, and the adhesive was placed on the smooth side thereof.

| Temperature (degrees F.) | Prior art (lbs/inch) | Invention (lbs/inch) |
| --- | --- | --- |
| 110 | 2.264 | 2.994 |
| 100 | 2.578 | 2.806 |
| 70 | 2.935 | 2.571 |
| 40 | 1.563 | 2.676 |
| 25 | 0.655 | 3.084 |
| 20 | 0.157 | 2.086 |

It will become apparent that the product made according to the invention has superior adhesion at all temperatures except around room temperature. However, even at that temperature, both products exceed the minimum by a factor of at least 1.0 lbs/inch. At the extreme temperatures, where the prior art product has less adhesion, the product made according to the invention still exceeds the minimum. At extremely low temperatures, the product made according to the invention still exceeds the minimum, whereas the prior art product begins to fall below the minimum at around 40 degrees F.

The combination of the first layer 10 and second layer 20 has the benefits of nail-sealing and protection found in the rubberized asphalt due to the second layer 20 along with aggressive adhesion to 20 degrees F. and lower, including adhering to OSB, due to the first layer 10. But both of these characteristics are obtained without a significantly increased cost over the prior art due to the precise amounts of each product. This limited range produces an unexpectedly good product at reasonable cost.

The third layer 30 is a film that provides advantageous characteristics to the other layers. For example, the third layer 30 can be a metalized polyester film that reflects light very well, resists tearing of the first and second layers, and is suited to the end use of the tape 6. An example of this material is found in U.S. Pat. No. 6,479,119, which is incorporated above by reference. This third layer 30 is particularly advantageous when the tape 6 is used on doors and windows, because tape that seals doors and windows can be exposed to the elements for some time before being covered by siding. An alternative example of the third layer 30 is an aluminum foil laminated to cross-laminated polyethylene, which gives very strong puncture and tear resistance. Alternatively, or additionally, an ultraviolet (UV) light reflective film could be used as the third layer 30.

The exact composition of the third layer 30 is determined by the end use of the tape 6, and therefore can vary substantially while still being contemplated by the invention. The third layer 30 film can be a polymer, metal or combination film, a fabric, a particulate layer, such as sand or other particulate, or any other layer that is used conventionally on similar products.

In a preferred embodiment, the first layer 10 is formed as a hot, liquefied material poured or extruded onto a release liner. The release liner is preferably wound around a chilled drum and the hot adhesive is forced through a slot die coating head onto the liner as a liquid, semi-liquid or paste. The hot adhesive solidifies as it cools on the liner that is in direct contact with the chilled drum. The second layer 20 is then preferably formed on the first layer 10 in a conventional manner for forming rubberized asphalt layers. The third layer 30 is then applied to the second layer 20 in a conventional manner for applying films to rubberized asphalt layers. The laminate is then preferably rolled around itself or onto a core into a roll of a predetermined length in a conventional manner.

Figure 2:
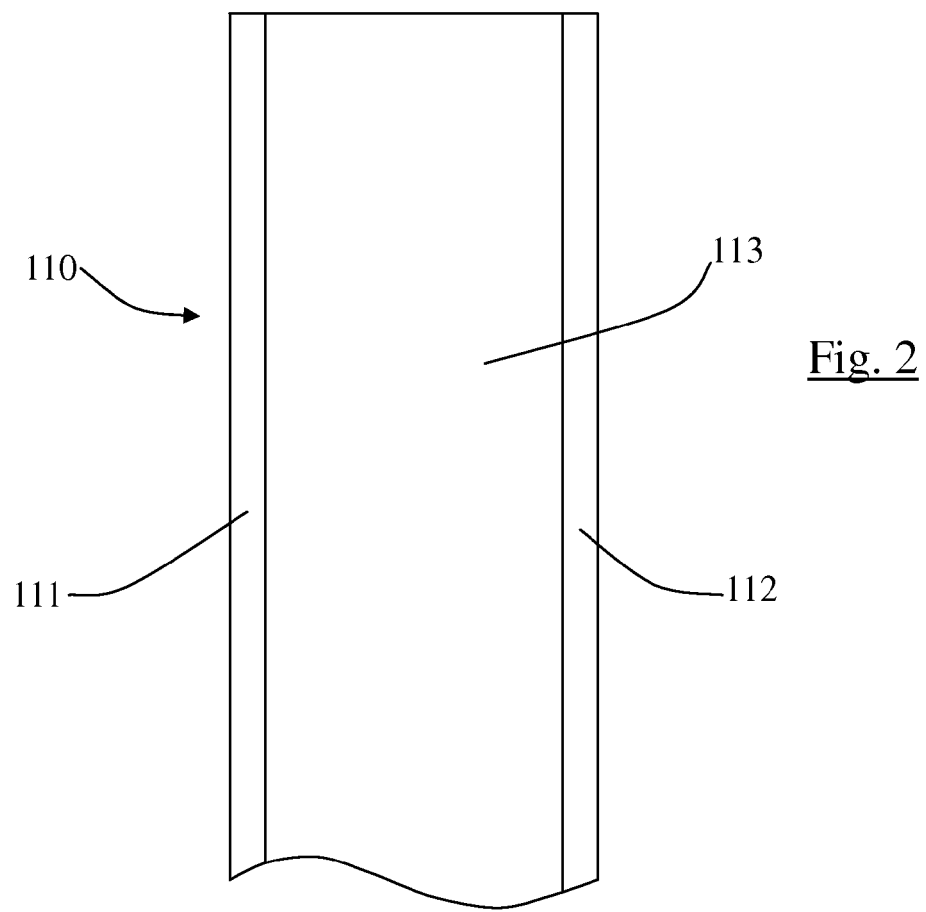
FIG. 2 is a bottom view illustrating an alternative embodiment of the present invention.
Figure 3:
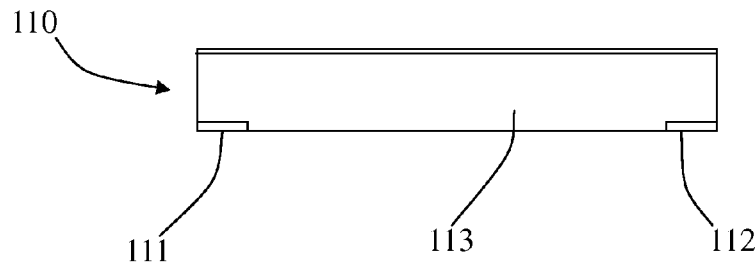
FIG. 3 is an end view illustrating the embodiment of FIG. 2.

When the first layer 10 is being formed, it is preferably dispensed onto the release liner 8 in a wide, long ribbon that is preferably close in width to the width of the release liner and is contiguous across the width of the liner. In such an embodiment, as shown in FIG. 1, the second layer 20 is formed on top of, and parallel to, the first layer 10. However, in an alternative embodiment, the adhesive can be dispensed onto the release liner in strips, such as ¼ inch wide or some other width. This is shown in FIGS. 2 and 3 in which the strips 111 and 112 of the tape 110 are an adhesive preferably formed as a first layer by the hot melt process noted above, and in which the rubberized asphalt 113 is formed as a second layer on the strips 111 and 112 and the release liner (in the space between the strips 111 and 112). Thus, the "second layer" is rubberized asphalt, even though it forms a strip of rubberized asphalt between, and with a facing surface that is on the same plane as, the faces of the first layer strips 111 and 112 (see FIG. 3). A third layer film is then formed on the embodiment of FIGS. 2 and 3.

The embodiment of FIGS. 2 and 3 provides an advantageous combination of low and high temperature adhesion while using only a portion of the expensive adhesive as part of the first layer. The first layer adhesive loses adhesion at higher temperatures (e.g., greater than 100 degrees F.), but the rubberized asphalt has good adhesion at and above these higher temperatures, and therefore provides tackiness when the first layer adhesive begins to lose its tackiness.

Figure 4:
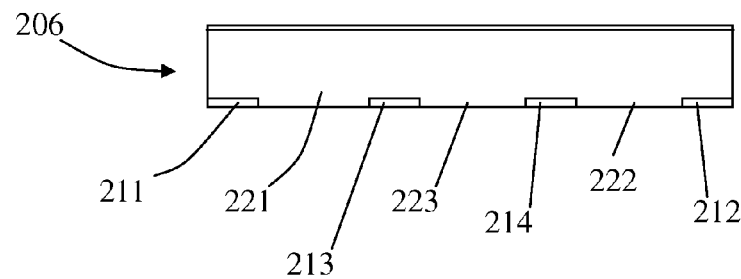
FIG. 4 is an end view illustrating an alternative embodiment of the present invention.
Figure 5:
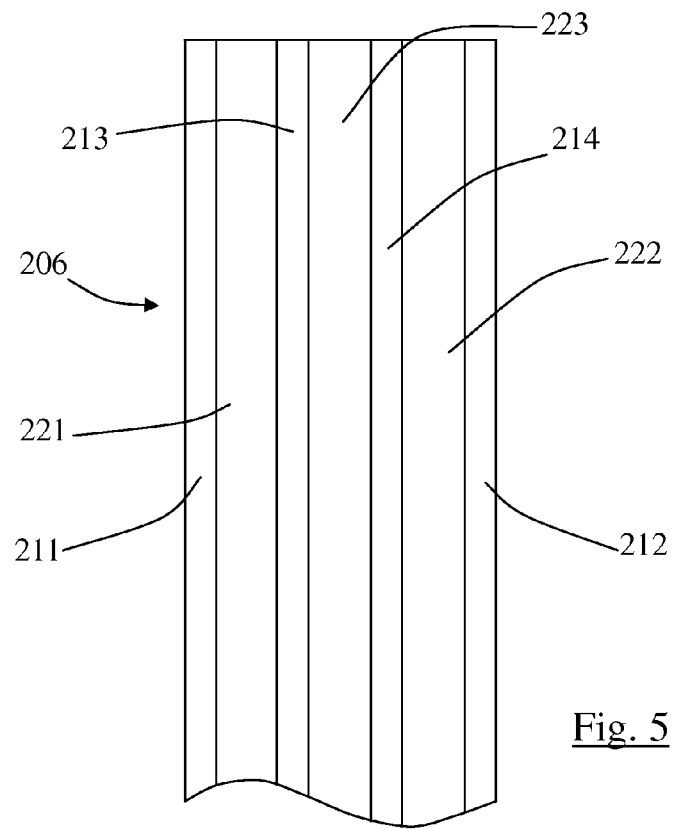
FIG. 5 is a bottom view illustrating the embodiment of FIG. 4.

It will be understood that any number and size of strips of adhesive and rubberized asphalt can be used. In another alternative embodiment, shown in FIGS. 4 and 5, a tape 206 is formed by first forming a plurality of adhesive strips 211, 212, 213 and 214 on a release liner (not shown) as discussed above. Then a layer of rubberized asphalt 220 is formed on the top of the strips 211-214 as described above. This layer 220 includes the rubberized asphalt strips 221, 222 and 223 that are formed between the adhesive strips 211-214 when the rubberized asphalt is applied over the strips 211-214 and the release liner. Thus, rather than having only adhesive strips on opposite edges as in the embodiment of FIGS. 2 and 3, the embodiment of FIGS. 4 and 5 has adhesive strips at spaced locations across the width of the tape 206. A third layer film is formed on the embodiment of FIGS. 4 and 5.

There are still other variations that are contemplated for the invention but are not illustrated or described herein, because they will become apparent to the person having ordinary skill. For example, adhesive strips can be formed of virtually any size, number and relative location. Still further, the strips of the same material can be the same width (and/or thickness) as other strips of the same material, but need not be. Likewise, strips of different material can be the same width (and/or thickness), but need not be. Indeed, every strip of material can be the same size, or every strip can be a different size. It should be pointed out that the strips need not be straight, although straight strips are easily formed. Instead, the strips could be curved. Still further, the first layer does not have to be applied as a hot melt, but it is very convenient and advantageous to do so using current technology. Other manners of applying the first layer are possible, such as by spraying, chemical vapor deposition, hand-application, etc.

Figure 7:
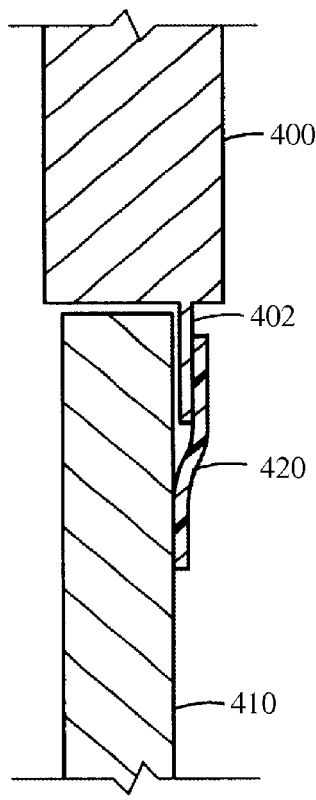
FIG. 7 is a side view in section showing the preferred embodiment of the present invention mounted in another operable configuration to a window mounted in a wall opening.

As noted above, the laminate tape made according to the invention can be used in many ways, and it is contemplated that the primary use to which the tape will be put, which should not be considered limiting, is at window and door junctions with sheathing as illustrated in FIG. 7. The window 400 has a conventional flange 402 that extends over, and contacts or comes into close proximity to, sheathing 410. An opening is formed in the sheathing 410 as is conventional, and the window 400 is inserted into the opening with the flange 402 overlapping the sheathing 410 edge. A conventional fastener, such as a nail, staple or screw (not shown) is driven through the flange 402 into the sheathing 410 to secure the window 400 mechanically to the sheathing 410 in particular, and the wall in general. The tape 420 is then applied with its central region over the seam formed at the flange/sheathing junction, and with its lateral edges extending over to the adjacent portions of the flange 402 and sheathing 410 as illustrated in FIG. 7. This forms a substantial barrier to water and air penetration.

Figure 6:
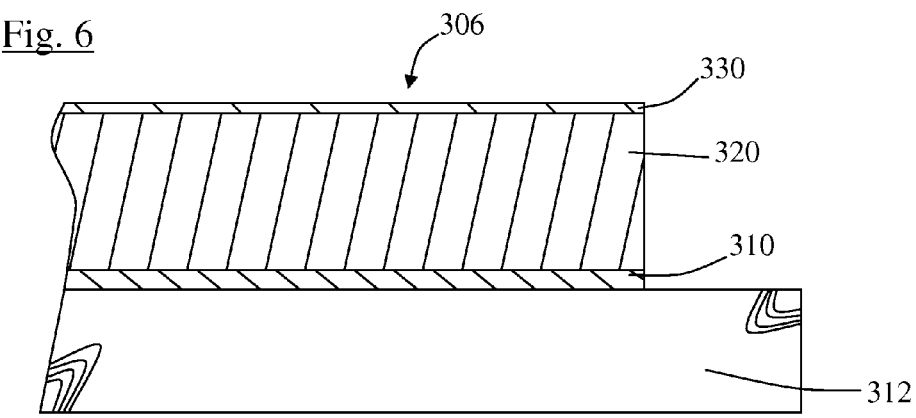
FIG. 6 is a side view in section showing the preferred embodiment of the present invention mounted in an operable configuration adhered to construction material.
Figure 8:
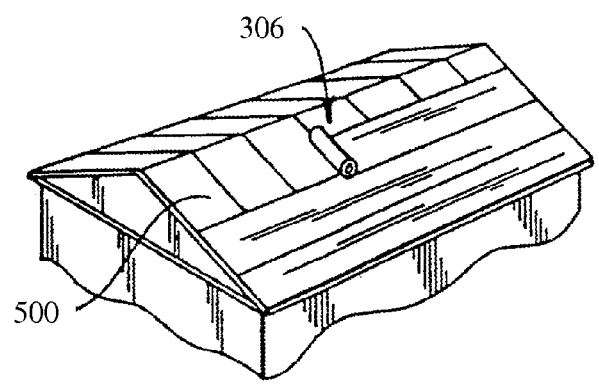
FIG. 8 is a view in perspective illustrating an embodiment of the invention mounted in another operable configuration to a roof.

In an alternative use of the invention illustrated in FIG. 8, the roof 500 of a building is made up of OSB sheathing, metal or some other product that structurally supports the framework of the building. A roll of laminate 306 made according to the invention is applied to the roof 500 to prevent or reduce the infiltration of water and other elements. FIG. 6 illustrates a close-up sectional view showing the laminate 306 in place adhered to the roof sheathing 312. The thicknesses of the layers 310, 320 and 330 of the laminate 306 are shown as in the embodiment of FIG. 1, and are not to be considered restrictive as to their actual thicknesses. Instead, FIG. 6 shows the adhesive first layer 310 adhered to the sheathing 312, with the rubberized asphalt layer 320 sandwiched between the adhesive first layer 310 and the film third layer 330. From these examples, which are illustrative and not limiting, it will become apparent that embodiments of the invention can be used in many circumstances, including to wrap outdoor ductwork on commercial buildings to provide water sealing from rain, sleet and snow, damage due to sunlight and impacts from hail, branches or other objects, and to provide roof flashing.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A structural sealing laminate comprising:
    (a) an adhesive layer having a first side, an opposite second side and a thickness of between about 0.001 and about 0.01 inches;
    (b) a bituminous rubberized asphalt layer having a thickness of between about 0.01 and about 0.06 inches, the asphalt layer having a first side secured to the first side of the adhesive layer, the asphalt layer having a second side opposite the first side, wherein the adhesive layer has a different chemical composition than the bituminous rubberized asphalt layer, resulting in adhesive characteristics that are superior to the bituminous rubberized asphalt layer at temperatures less than about 50 degrees F.; and
    (c) a film layer having a first side and a second, opposite side secured to the second side of the asphalt layer;
    wherein the adhesive layer comprises at least a first strip of adhesive and a second, separate strip of adhesive, the asphalt layer comprises an exposed portion interposed between the first and second adhesive strips, and the exposed asphalt layer portion has a face that is coplanar with the second side of the adhesive layer's first and second strips and forms a planar surface with the second side of the adhesive layer's first and second strips.

2. The structural sealing laminate in accordance with claim 1, further comprising a release liner releasably secured to the second side of the adhesive layer.

3. The structural sealing laminate in accordance with claim 1, wherein the adhesive layer has a thickness between about 0.002 and about 0.005 inches.

4. The structural sealing laminate in accordance with claim 3, wherein the adhesive layer has a thickness between about 0.002 and about 0.003 inches.

5. The structural sealing laminate in accordance with claim 4, wherein the bituminous rubberized asphalt layer has a thickness between about 0.02 and about 0.04 inches.

6. The structural sealing laminate in accordance with claim 5, wherein the film layer further comprises a metalized polymer layer.

7. The structural sealing laminate in accordance with claim 6, wherein the adhesive layer further comprises an adhesive having an adhesion of at least about 1.5 lbs/inch for all temperatures between about 20 degrees F. and about 110 degrees F., when tested in a 180 degree peel test with oriented strand board (OSB).

8. In combination with a flange on a window frame and an adjacent wall edge, a laminate strip disposed in an overlying and sealing relationship with a seam defined by an edge of the flange and the adjacent wall edge, the laminate strip comprising:
    (a) an adhesive layer having at least a first strip of adhesive and a second, separate strip of adhesive, the adhesive layer including a first side, an opposite second side and a thickness of between about 0.001 and about 0.01 inches, wherein the second side is adhered to the flange and the adjacent wall edge;
    (b) a bituminous rubberized asphalt layer having a thickness of between about 0.02 and about 0.06 inches, the asphalt layer having a first side secured to the first side of the adhesive layer, the asphalt layer having a second side opposite the first side and an exposed portion interposed between the first and second adhesive strips, wherein the exposed asphalt layer portion has a face that is coplanar with the second side of the adhesive layer's first and second strips and is adhered to the flange and the adjacent wall edge, and wherein the adhesive layer has a different chemical composition than the bituminous rubberized asphalt layer, resulting in adhesive characteristics that are superior to the bituminous rubberized asphalt layer at temperatures less than about 50 degrees F.; and
    (c) a film layer having a first side and a second, opposite side secured to the second side of the asphalt layer, wherein the second side faces toward the flange and the adjacent wall edge.

9. The combination in accordance with claim 8, further comprising a fastener penetrating the laminate strip and the flange, thereby forming a passage through the laminate strip, and embedded in the adjacent wall edge, wherein the bituminous rubberized asphalt layer forms a seal around the fastener at the passage to substantially prevent contaminants from passing entirely through the passage.

\* \* \* \* \*